United States Patent [19]

Gottschalk

[11] Patent Number: 5,330,601
[45] Date of Patent: Jul. 19, 1994

[54] SURFACE MODIFICATION OF ELASTOMERS FOR BONDING

[75] Inventor: Peter Gottschalk, Maplewood, Minn.

[73] Assignee: H.B. Fuller Licensing & Financing, Inc., Minneapolis, Minn.

[21] Appl. No.: 64,964

[22] Filed: May 20, 1993

[51] Int. Cl.$^5$ .............................................. B32B 31/00
[52] U.S. Cl. .................................. 156/281; 106/286.8; 106/287.32; 156/316; 156/319; 156/331.4; 156/629; 264/340; 427/322; 525/331.9; 528/487
[58] Field of Search ................. 264/340; 156/281, 319, 156/316, 629, 331.4; 106/286.8, 287.32; 525/331.9; 528/487; 427/322

[56] References Cited

U.S. PATENT DOCUMENTS

| | | | |
|---|---|---|---|
| 3,813,380 | 5/1974 | Bock et al. | 156/331.4 |
| 4,243,771 | 1/1981 | Kaufman | 427/322 |
| 5,110,629 | 5/1992 | Gomberg et al. | |

OTHER PUBLICATIONS

"Surface Modification of Elastomers for Bonding", D. Oldfiend and T. E. F. Symes, The Journal of Adhesion, 1983, vol. 16, pp. 77–96.

"Oxidation of Alkenes with Aqueous Potassium Peroxymonosulfact and No Organic Solvent", Weiming Zhu and Warren T. Ford, American Chemical Society, 1991.

"Oxone Monopersulfate Compound", Data Sheet from Dupont, Sep. 1988.

Abstract: "Surfact Treatment of Polybutadiene Moldings", JP 59085737 A2, 17 May 1984 Showa, JP 82-196570, 8 Nov. 1982.

Abstract: "Modification of Vulcanizates with Sodium Hypochlorite", M. A. Krakshin, E. I. Plechko, A. P. Zvonkova, R. Sh. Frenkel, A. S. Kuz'minskii, USSR, 1973.

Abstract: "Surface Modification of Polymer Materials", V. A. Orlov, V. D. Zaitseva, V. A. Sinitsyn, E. E. Rostóvtseva, U.S. Pat. No. 3,843,617, 22 Oct. 1974, U.S. Ser. No. 70-55,289, 15 Jul. 1970.

Abstract: "Surface Treatment of Rubber to Reduce Friction", A. D. Roberts, C. A. Brackley, J. Nat. Rubber Res., 4(1), 1–21, 1989.

Abstract: "Prevention of Hydrosilation Cure Inhibition in a Polysiloxane", R. Fountain, J. L. Kardos, J. Adhes., 8(1), 21–41, 1976.

Abstract: "Aqueous Chromic Acid–Sulfuric Acid– and Chromic Acid–Sulfric Acid–Phosphoric Acid Mixtures and Their Use as Etching Solutions for Metalization of Plastics", Hartmut Mahlkow, Jahrb. Oberflaechentech., 47, 49–62, 1991.

Primary Examiner—John J. Gallagher
Attorney, Agent, or Firm—Vidas, Arrett & Steinkraus

[57] ABSTRACT

Pretreatment of elastomer substrate surfaces with aqueous solutions of monopersulfate compound (MPS) and the improved adhesive bonds obtained between such pretreated substrate surfaces and other substrates.

23 Claims, No Drawings

SURFACE MODIFICATION OF ELASTOMERS FOR BONDING

BACKGROUND OF THE INVENTION

Field of the Invention

This invention is concerned with improving the adhesive bonding of elastomer or plastic rubber materials based on diene monomers, hereinafter "rubber substrates", to other substrates. For example, improved adhesive bonding is desired in the shoe industry in particular as well as in other industries where rubber substrates are adhesively bonded to other like or unlike substrates. The term "rubber substrate" is used hereinafter in the general sense to include any rubber materials based on diene monomers. Examples of such materials are the following:

| | |
|---|---|
| SBR | (styrene-butadiene copolymer) |
| NR | (natural rubber) |
| NBR | (acrylonitrile-butadiene copolymer) |
| BR | (polybutadiene) |
| BIIR | (bromoisobutene-isoprene copolymer) |
| CIIR | (chloroisobutene-isoprene copolymer) |
| CR | (polychloroprene) |
| IIR | (isobutene-isoprene copolymer) |
| IR | (polyisoprene) |

Adhesive bonding to such materials typically requires a pretreatment or surface treatment such as by oxidation to provide an acceptable bond. This is sometimes referred to as "priming" the plastic substrate surface but is also described as a "surface treatment". New more effective compositions for surface treatment are always desired. However, it is also desirable to identify those compositions which are not noxious or have other negative handling characteristics.

Current surface treatment compositions in use today include dichlorodimethylhydantoin in $CH_2 Cl_2$ and trichloroisocyanuric acid (TCICA) in ethyl acetate. These compositions are corrosive, require organic solvent and can liberate chlorine on reaction, none of which are desirable. Additionally, they tend to dissolve some plastic substrates and in some cases even attack the adhesive and also present disposal problems.

The previously used aqueous based surface treatment compositions for improving adhesion to rubber materials commercially has consisted of acidified solutions of sodium hypochlorite which is not favored due to release of toxic chlorine gas from the solution.

This invention has discovered that the use of monopersulfate compound (MPS) has many advantages for surface treatment. MPS is available commercially from Du Pont under the trade name OXONE, and has been typically utilized in cleaning and sanitizing formulations.

SUMMARY OF THE INVENTION

In accordance with this invention, it has been discovered than an aqueous solution of monopersulfate compound ($2KHSO_5.KHSO_4.K_2SO_4$), a triple salt peroxygen compound (MPS) in the form of a white granular powder is an effective "composition" for the surface treatment of rubber substrates which are to be adhesively bonded to other substrates. Not only does this invention provide improved adhesive bonding at least as effective as that provided by the prior art, and in many instances even better, but it avoids the use of solvents and chlorinated materials. Thus, through the use of such a specific aqueous system this invention avoids evolution of VOC's, is less hazardous and easy to use and does not require special disposal methods.

Specifically, for example, the pretreatment method in one embodiment of the invention is comprised of spreading a 4% aqueous solution of monopersulfate compound and a small amount of anionic surfactant onto a rubber substrate e.g., synthetic rubber i.e., styrene butadiene rubber (SBR), for example. After five minutes the solution is washed off; the rubber substrate is dried and an adhesive e.g., two-part polyurethane adhesive, is applied to the rubber substrate surface for bonding.

The method of the invention may also be regarded in a broader sense as also involving the bonding of the rubber substrates as is described in further detail hereinbelow.

DETAILED DESCRIPTION OF THE INVENTION

In developing this invention, the MPS aqueous solutions were compared to the most effective standard presently in commercial use i.e., solvent based TCICA. These studies also included parameter optimizations with respect to MPS from a commercial and practical standpoint. In the examples below, the substrates are all SBR. The monopersulfate compound (MPS) used by the invention is readily available from DuPont Company, Wilmington, Del. 19898 under the name OXONE® Monopersulfate Compound.

The adhesive used in many of the examples is Ultraflex 4320 a solvent cut urethane with Desmodur RE as the hardener. Ultraflex 4320 is available from H. B. Fuller GmbH. Desmodur RE is available from Bayer AG. The ratio of adhesive: hardener is 100:5 parts by weight. The adhesive is applied to a 4 mil thickness to both substrates which are to be bonded together in a heat press as is typical for contact adhesives. Many other adhesives may be used as well.

EXAMPLE 1

Pretreating SBR and other rubber substrates with an aqueous solution of MPS dramatically improved adhesion with adhesives such as NP-6042, a two part polyurethane adhesive from H. B. Fuller Co. The method of pretreatment in one embodiment consists of spreading a 2% aqueous solution of MPS containing a small amount of anionic surfactant on the SBR rubber substrates. After five minutes the solution was washed off and the rubber substrate patted dry with a paper towel. The adhesive was then applied and allowed to cure for 24 hours. Other oxidants were applied to other SBR rubber substrates in a similar manner giving the comparative results shown below. The effect of surface treatment on adhesion was determined through T-peel measurements.

| SBR TREATMENT | T-PEEL (pli)* |
|---|---|
| None | 3.4 |
| Ethyl Acetate (solvent wipe) | 4.8 |
| H2O/surfactant | 3.8 |
| 2% KMnO4/H2O/surfactant | 2.3 |
| 2% OXONE/H2O/surfactant | 72.3** |
| 2% TCICA/Ethyl Acetate | 115.6 |

*Cross head speed in all examples is 4 in/min.
**TCICA - Trichloroisocyanuric acid.

As can be seen, the unoptimized MPS formulation gives comparable improved adhesion as compared to the very noxious TCICA.

EXAMPLE 2

SBR rubber substrates and NBR substrates were also tested using a hot melt moisture cure urethane adhesive giving the results shown in the table below. The effect of surface treatment on adhesion was determined through lapshear measurements.

| Oxidant | Treatment Time | Lapshears (lbs/in*2) Acrylonitrile-Butadiene Rubber | SBR |
|---|---|---|---|
| NONE | | 61.8 | 100.8 |
| 2% MPS (aqueous) | 5 min. | 185.2 | 253.0 |
| 2% MPS (aqueous) | 10 min. | 196.4-no fail | 224.3 |
| 2% TCICA (EtOAc) | 5 min. | 156.8 | 144.6 |

"No fail" indicates that no bond failure occurred, the substrates just stretched and distorted. Here the MPS exceeded the TCICA in improving adhesion.

EXAMPLE 3

MPS Concentration

Testing T-Peel as a function of MPS concentration was also completed and the results are shown in the table below. The treatment time was 5 minutes and the adhesive was applied at 4 mil. thickness to both substrates. The adhesive used was Ultraflex 4320/Desmodur RE (100/5) on SBR substrates.

| Sample # | MPS wt. % | Anionic Surfactant* | Avg. T-Peel (Max. lbs) | Failure Type |
|---|---|---|---|---|
| A | None | 2-4 drops | 23.5 +/− 14.2 | adh. |
| B | 2% | 2-4 drops | 69.2 +/− 9.0 | coh./sub. |
| C | 4% | 2-4 drops | 157.5 +/− 9.6 | sub. |
| D | 6% | 2-4 drops | 154 +/− 12.7 | sub. |

*SEPKO surfactant from Monarch, a division of H. B. Fuller, was included in preparing this composition.

As a result of this series, a preferred MPS concentration appears to be 4%. The substrate failure noted on the 2% sample was only along the edges. The 4 and 6% samples had complete substrate breakage.

EXAMPLE 4

MPS Treatment Time

Testing T-Peels as a function of treatment time was completed and is shown below. The MPS primer was at 4% concentration. A contact adhesive (Ultraflex 4320) was applied to both SBR substrates at 4 mil. thickness. The control was primerless.

| Sample # | Treat. Time (mins.) | Avg. T-Peel (Max. lbs) | Failure Type |
|---|---|---|---|
| A | None | 7.8 +/− 0.9 | adh. |
| B | 1 | 107.4 +/− 32.2 | sub./coh. |
| C | 5 | 109.3 +/− 51.3 | sub./coh. |
| D | 10 | 115.5 +/− 45.6 | sub./coh. |
| E | 20 | 155.0 +/− 31.2 | sub. |

The samples done with 1, 5, and 10 minute treatment times were all comparable in strength. The 20 minute sample showed an unexpected increase. A treatment time of 5 minutes has been chosen as the preferred practical standard for the Examples below. Of course, if less time is desired, higher concentrations may be used.

EXAMPLE 5

MPS pH

Testing T-Peels as a function of the MPS primer pH was also completed and is shown below. The 4% MPS solution was pH adjusted with 10% KOH. The treatment time was 5 minutes. The contact adhesive (Ultraflex 4320) was applied to both SBR substrates at a 4 mil. thickness.

| Sample # | pH | Avg. T-Peel (Max. lbs) | Failure Type |
|---|---|---|---|
| A | 3.19 | 92.2 +/− 16.9 | coh.* |
| B | 5.38 | 114.4 +/− 40.4 | coh./adh. (90/10)* |
| C | 7.47 | 56.1 +/− 2.8 | coh./adh. (50/50) |
| D | 9.41 | 57.3 +/− 5.6 | adh. |

*Substrate edge failure noted.

The pH of the primer solution had a definite effect on the peel strength. At the pH of ~5, the peel strengths were at a maximum. The peel strength quickly drops off as the primer reaches neutral and basic pH levels. This may be due to the decomposition of the MPS. All further work will be done with a preferred pH of the primer between about 3 and 5.

EXAMPLE 6

SBR Rubber Substrates

This example evaluates MPS as a replacement primer for TCICA on SBR robber substrates.

The substrates were surface treated using the standards set during the MPS parameter screening in previous examples. The MPS primer had a 4% concentration at pH 2.78 and a 5 minute treatment time was used. The adhesive was Ultraflex 4320/Desmodur RE and was applied at a 4 mil. thickness to both substrates.

| Sample # | Primer used | Average T-Peel (Max. lbs +/− std. dev.) | Failure Type |
|---|---|---|---|
| A | None | 6.23 +/− 1.13 | adh |
| B | TCICA (2%) | 48.27 +/− 4.35 | sub |
| C | MPS (4%) | 43.67 +/− 4.40 | sub |

The TCICA and MPS samples were comparable to each other in both T-Peel strength and failure type. Because this evaluation gave positive results, MPS is regarded as a replacement for TCICA (particularly hazardous) for the surface treatment of rubber substrates.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of bonding substrates together wherein at least one of the substrates is of a rubber material based on diene monomers and is pretreated before bonding, the pretreatment comprising:

providing an aqueous solution of monopersulfate compound ($2KHSO_5 \cdot KHSO_4 \cdot K_2SO_4$);

applying the solution to the surface to be treated for a period of time, and subsequently substantially removing the solution from the surface; and subsequently bonding by applying adhesive to at least one of the substrate surfaces to be bonded and pressing them together for a period of time for adhesion.

2. The method of claim 1 wherein at least one of the substrates is SBR.

3. The method of claim 1 wherein the adhesive comprises a contact adhesive.

4. The method of claim 1 wherein the adhesive is applied to a thickness of about 4 mils.

5. The method of claim 1 including drying the surface prior to the application of adhesive thereto.

6. The method of claim 1 wherein the pH of the solution is within the range of about 2 to about 7.

7. The method of claim 1 wherein the pH range is about 3 to about 5.

8. The method of claim 1 wherein the removal of the solution is by rinsing.

9. The method of claim 8 wherein the rinse comprises water.

10. The method of claim 1 wherein the concentration of the monopersulfate in the solution is at least about 2% by weight.

11. The method of claim 1 wherein the period of time is at least about 5 minutes.

12. The method of claim 1 including providing a minor quantity of a surfactant in the aqueous solution.

13. The method of claim 1 wherein the concentration is at least about 4% by weight.

14. A method of surface treating a rubber material based on diene monomers for improved adhesive bonding thereto, comprising:

providing an aqueous solution of monopersulfate compound ($2KHSO_5 \cdot KHSO_4 \cdot K_2SO_4$);

applying the solution to the surface to be treated for a period of time, and substantially removing the solution from the surface.

15. The method of claim 14 including drying the surface after removal of the solution prior to the application of adhesive thereto.

16. The method of claim 14 wherein the pH of the solution is within the range of about 2 to about 7.

17. The method of claim 16 wherein the pH range is about 3 to about 5.

18. The method of claim 14 wherein the removal of the solution is by rinsing.

19. The method of claim 18 wherein the rinse comprises water.

20. The method of claim 14 wherein the concentration of the monopersulfate in the solution is at least about 2% by weight.

21. The method of claim 14 wherein the period of time is at least about 5 minutes.

22. The method of claim 14 including providing a minor quantity of a surfactant in the aqueous solution.

23. The method of claim 20 wherein the concentration is at least about 4% by weight.

* * * * *

UNITED STATES PATENT AND TRADEMARK OFFICE
CERTIFICATE OF CORRECTION

PATENT NO. : 5,330,601
DATED : July 19, 1994
INVENTOR(S) : Peter Gottschalk

It is certified that error appears in the above-indentified patent and that said Letters Patent is hereby corrected as shown below:

Column 4, line 34, delete "robber" and insert — rubber —.

Signed and Sealed this

Eighth Day of November, 1994

Attest:

BRUCE LEHMAN

Attesting Officer    Commissioner of Patents and Trademarks